(12) United States Patent
Gou et al.

(10) Patent No.: US 11,301,724 B2
(45) Date of Patent: Apr. 12, 2022

(54) SEMANTIC ADVERSARIAL GENERATION BASED FUNCTION TESTING METHOD IN AUTONOMOUS DRIVING

(71) Applicant: Robert Bosch GmbH, Stuttgart (DE)

(72) Inventors: Liang Gou, San Jose, CA (US); Lincan Zou, San Jose, CA (US); Axel Wendt, Ostfildern (DE); Liu Ren, Saratoga, CA (US)

(73) Assignee: ROBERT BOSCH GMBH (DE)

( * ) Notice: Subject to any disclaimer, the term of this patent is extended or adjusted under 35 U.S.C. 154(b) by 85 days.

(21) Appl. No.: 16/862,630

(22) Filed: Apr. 30, 2020

(65) Prior Publication Data
US 2021/0342647 A1 Nov. 4, 2021

(51) Int. Cl.
*G06K 9/62* (2006.01)
*G06N 3/08* (2006.01)
*G06T 9/00* (2006.01)
*G06K 9/00* (2022.01)

(52) U.S. Cl.
CPC ......... *G06K 9/6262* (2013.01); *G06K 9/6257* (2013.01); *G06N 3/08* (2013.01); *G06T 9/002* (2013.01); *G06K 9/00825* (2013.01)

(58) Field of Classification Search
CPC ............ G06K 9/6262; G06K 9/6257; G06K 9/00825; G06T 9/002; G06N 3/08
USPC ........................................................ 382/103
See application file for complete search history.

(56) References Cited

U.S. PATENT DOCUMENTS

| | | | | |
|---|---|---|---|---|
| 11,049,243 | B2* | 6/2021 | Odry | G06K 9/6244 |
| 2019/0295721 | A1* | 9/2019 | Madabhushi | G16H 30/40 |
| 2020/0151505 | A1* | 5/2020 | Saito | G06K 9/6256 |
| 2021/0150354 | A1* | 5/2021 | Karras | H04N 7/157 |
| 2021/0192335 | A1* | 6/2021 | Das | G06N 3/0454 |

OTHER PUBLICATIONS

Papernot et al., "Practical Black-Box Attacks against Machine Learning", Asia CCS, Apr. 2017, United Arab Emirates, 14 pages.
Goodfellow et al., "Generative Adversarial Nets", Montreal, Jun. 2014, 9 pages.
Szegedy et al., "Intriguing Properties of Neural Networks", Feb. 2014, 10 pages.
Wang et al., At-Gan: An Adversarial Generator Model for Non-Constrained Adversarial Examples, Feb. 2020, 15 pages.
Higgins et al., "Beta-VAE: Learning basic visual concepts with a constrained variational framework", ICLR 2017, 13 pages.

(Continued)

*Primary Examiner* — Juan A Torres
(74) *Attorney, Agent, or Firm* — Dickinson Wright PLLC

(57) ABSTRACT

A system includes a camera configured to obtain image information from objects. The system also includes a processor in communication with the camera and programmed to receive an input data including the image information, encode the input via an encoder, obtain a latent variable defining an attribute of the input data, generate a sequential reconstruction of the input data utilizing at least the latent variable and an adversarial noise, obtain a residual between the input data and the sequential reconstruction utilizing a comparison of at least the input and the reconstruction to learn a mean shift in latent space, and output a mean shift indicating a test result of the input compared to the adversarial noise based on the comparison.

20 Claims, 6 Drawing Sheets

(56) References Cited

OTHER PUBLICATIONS

Li et al., "NATTACK: Learning the Distributions of Adversarial Examples for an Improved Black-Box Attack an Deep Neural Networks", Proceedings of the 36th International Conference on Machine Learning, California, PMLR 97, 2019, 13 pages.
Kingma et al., "Auto-Encoding Variational Bayes", May 2014, 14 pages.
Vincent et al., "Stacked denoising autoencoders: Learning useful representations in a deep network with a local denoising criterion,"Journal of Machine Learning Research, vol. 11, No. Dec., p. 3371-3408, 2010, 38 pages.

* cited by examiner

SEMANTIC ADVERSARIAL GENERATION BASED FUNCTION TESTING METHOD IN AUTONOMOUS DRIVING

TECHNICAL FIELD

The present disclosure relates to autonomous operation and testing of input images, including those collected in autonomous driving.

BACKGROUND

Understanding the robustness and potential vulnerability is an important task in functional testing for Deep Neural Network (DNN) models, especially in safety critical applications like autonomous driving. Recently, DNN based models have exhibited significant performance in terms of accuracy in the domain of computer vision, such as image classification, object detection, semantic segmentation, etc. These modules may be usually core components as the perception system in autonomous driving. Thus, a thorough function testing for such models is critical for its adoption in autonomous driving.

SUMMARY

According to one embodiment, a system includes a camera configured to obtain image information from objects. The system also includes a processor in communication with the camera and programmed to receive an input data including the image information, encode the input via an encoder, obtain a latent variable defining an attribute of the input data, generate a sequential reconstruction of the input data utilizing at least the latent variable and an adversarial noise, obtain a residual between the input data and the sequential reconstruction utilizing a comparison of at least the input and the reconstruction to learn a mean shift in latent space, and output a mean shift indicating a test result of the input compared to the adversarial noise based on the comparison.

According to a second embodiment, an apparatus includes a processor programmed to receive an input data including at least an image of an object, encode the input data via an encoder, obtain a latent variable defining an attribute of the input data, generate a sequential reconstruction of the input data utilizing at least the latent variable and an adversarial noise, obtain a residual between the input data and the sequential reconstruction utilizing a comparison of at least the input and the reconstruction to learn a mean shift in latent space, and output the mean shift indicating a test result of the input compared to the adversarial noise based on the comparison.

According to a third embodiment, a computer-program product stores instructions which, when executed by a computer, cause the computer to receive an input data, encode the input via an encoder, obtain a latent variable defining an attribute of the input data, generate a sequential reconstruction of the input data utilizing at least the latent variable and an adversarial noise, obtain a residual between the input data and the sequential reconstruction utilizing a comparison of at least the input and the reconstruction of a mean shift in latent space, and output a mean shift indicating a test result of the input compared to the adversarial noise based on the comparison.

DETAILED DESCRIPTION

Figure 1:
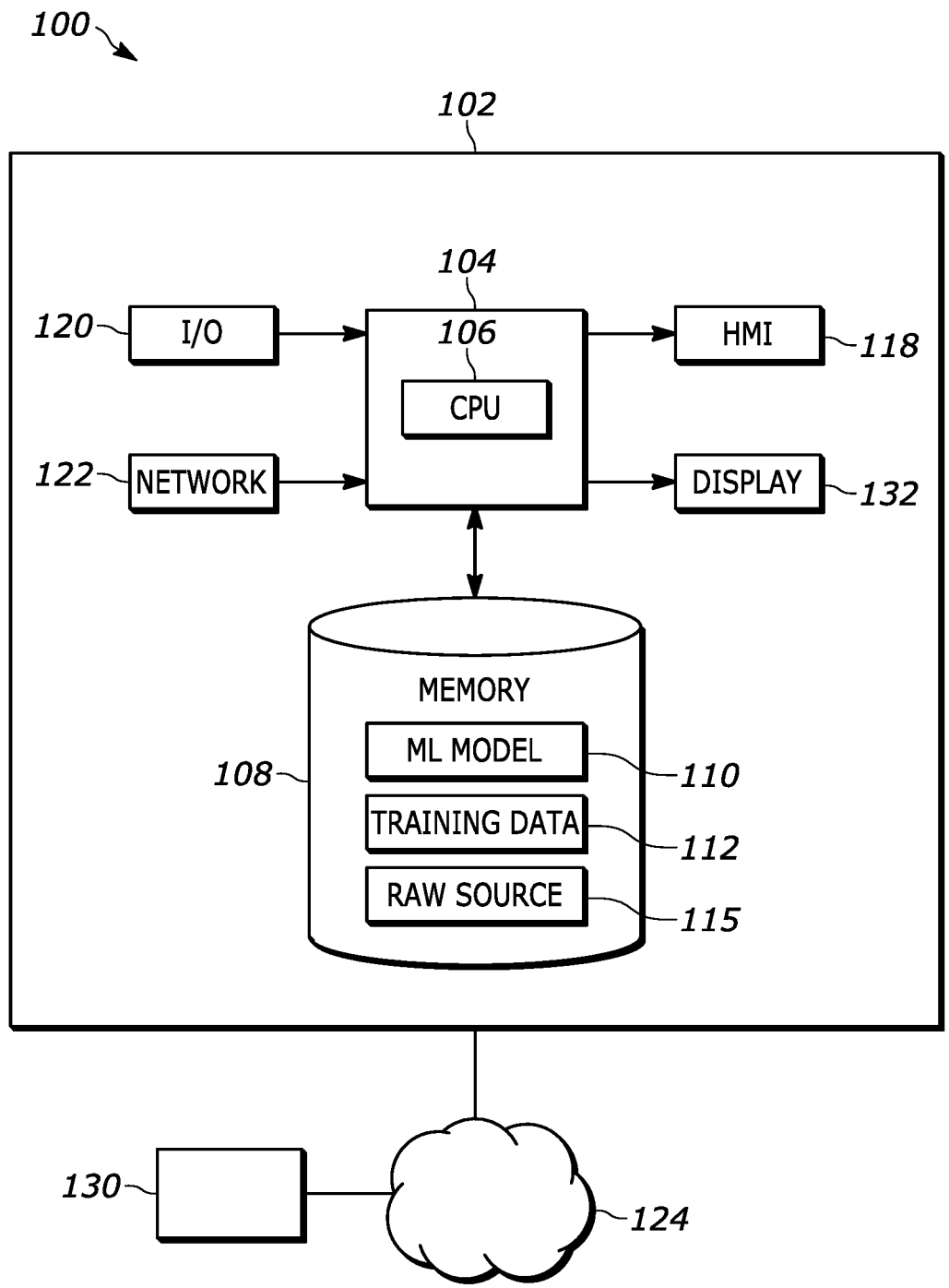
FIG. 1 depicts a data annotation system 100 to implement a system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Powerful adversarial attack methods are vital for understanding how to construct robust deep neural networks (DNNs) and for thoroughly testing defense techniques. A black-box adversarial attack algorithm that can defeat both vanilla DNNs and those generated by various defense techniques may be helpful. Instead of searching for an "optimal" adversarial example for a benign input to a targeted DNN, one solution may be to find a probability density distribution over a small region centered around the input, such that a sample drawn from the distribution is likely an adversarial example, without the need of accessing the DNN's internal layers or weights. Adversarial training remains one of the best defense techniques, and the adversarial examples are not as transferable across defended DNNs as across plain DNNs.

Understanding the robustness and potential vulnerability is an important task in functional testing for Deep Neural Network (DNN) models, especially in safety critical applications like autonomous driving. Recently, DNN based models have exhibited significant performance in terms of accuracy in the domain of computer vision, such as image classification, object detection, semantic segmentation, etc. These modules may be usually core components as the perception system in autonomous driving. Thus, a thorough function testing for such models is critical for its adoption in autonomous driving.

Recent advances in adversarial attacks bear some huge potentials for the function testing in DNN models. One challenge in function testing is how to efficiently collected or generate test cases with good coverage and reveal the potential vulnerability of DNN models. Adversarial sample learning provides an opportunity to have end-to-end solution by searching adversarial space with gradient information obtained from DNN models. In a model that can fool a classifier to misclassify a panda as a gibbon by adding some noises from the model gradients, the DNN model can focus on adversarial test cases, versus those test cases over which the model already has good performance.

Applying adversarial attack learning to function testing for DNN models is a non-trivial task. There are several challenges with mainstream adversarial attack methods. First, most adversarial attack methods do not generate examples with semantics. These methods aim to fail target models by adding as small noises as possible that human cannot perceive, and so the generated adversarial examples look like the same as the original images to humans. Therefore, these noises do not have physical meanings or semantics for human to understand the weakness of DNN models. Second, a large body of attack methods need to know the architecture and parameter details of a target model to generate adversarial examples, namely, a white-box approach. This limits its applications for function testing because it is very expensive to acquire these details to test numerous models. Few black-box based approaches are proposed and also only apply to non-semantic adversarial examples. Additionally, there is no mechanism or method to reveal the adversarial landscape of a model. For example, with a current method, we do not know what the common patterns of the learned adversarial examples are. It may not be clear if these patterns are explainable to helpful to improve the method. The semantic adversarial generation based function testing method shown below, with limited black-box queries for object detect models, may address such challenges.

FIG. 1 depicts a data annotation system 100 to implement a system. The data annotation system 100 may include at least one computing system 102. The computing system 102 may include at least one processor 104 that is operatively connected to a memory unit 108. The processor 104 may include one or more integrated circuits that implement the functionality of a central processing unit (CPU) 106. The CPU 106 may be a commercially available processing unit that implements an instruction stet such as one of the x86, ARM, Power, or MIPS instruction set families. During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, a training dataset 112 for the machine-learning model 110, raw source dataset 115.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 may be in communication with the external network 124.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122.

The system 100 may be implemented using one or multiple computing systems. While the example depicts a single computing system 102 that implements all of the described features, it is intended that various features and functions may be separated and implemented by multiple computing units in communication with one another. The particular system architecture selected may depend on a variety of factors.

The system 100 may implement a machine-learning algorithm 110 that is configured to analyze the raw source dataset 115. The raw source dataset 115 may include raw or unprocessed sensor data that may be representative of an input dataset for a machine-learning system. The raw source dataset 115 may include video, video segments, images, text-based information, and raw or partially processed sensor data (e.g., radar map of objects). In some examples, the machine-learning algorithm 110 may be a neural network algorithm that is designed to perform a predetermined function. For example, the neural network algorithm may be configured in automotive applications to identify pedestrians in video images.

The computer system 100 may store a training dataset 112 for the machine-learning algorithm 110. The training dataset 112 may represent a set of previously constructed data for training the machine-learning algorithm 110. The training dataset 112 may be used by the machine-learning algorithm 110 to learn weighting factors associated with a neural network algorithm. The training dataset 112 may include a set of source data that has corresponding outcomes or results that the machine-learning algorithm 110 tries to duplicate via the learning process. In this example, the training dataset 112 may include source videos with and without pedestrians and corresponding presence and location information. The source videos may include various scenarios in which pedestrians are identified.

The machine-learning algorithm 110 may be operated in a learning mode using the training dataset 112 as input. The machine-learning algorithm 110 may be executed over a number of iterations using the data from the training dataset 112. With each iteration, the machine-learning algorithm 110 may update internal weighting factors based on the achieved results. For example, the machine-learning algorithm 110 can compare output results (e.g., annotations, latent variables, adversarial noise, etc.) with those included in the training dataset 112. Since the training dataset 112 includes the expected results, the machine-learning algorithm 110 can determine when performance is acceptable. After the machine-learning algorithm 110 achieves a predetermined performance level (e.g., 100% agreement with the outcomes associated with the training dataset 112), the machine-learning algorithm 110 may be executed using data that is not in the training dataset 112. The trained machine-learning algorithm 110 may be applied to new datasets to generate annotated data.

The machine-learning algorithm 110 may be configured to identify a particular feature in the raw source data 115. The raw source data 115 may include a plurality of instances or input dataset for which annotation results are desired. For example, the machine-learning algorithm 110 may be configured to identify the presence of a pedestrian in video images and annotate the occurrences. The machine-learning algorithm 110 may be programmed to process the raw source data 115 to identify the presence of the particular features. The machine-learning algorithm 110 may be configured to identify a feature in the raw source data 115 as a predetermined feature (e.g., pedestrian). The raw source data 115 may be derived from a variety of sources. For example, the raw source data 115 may be actual input data collected by a machine-learning system. The raw source data 115 may be machine generated for testing the system. As an example, the raw source data 115 may include raw video images from a camera.

In the example, the machine-learning algorithm 110 may process raw source data 115 and output an indication of a representation of an image. The output may also include augmented representation of the image. A machine-learning algorithm 110 may generate a confidence level or factor for each output generated. For example, a confidence value that exceeds a predetermined high-confidence threshold may indicate that the machine-learning algorithm 110 is confident that the identified feature corresponds to the particular feature. A confidence value that is less than a low-confidence threshold may indicate that the machine-learning algorithm 110 has some uncertainty that the particular feature is present.

Figure 2:
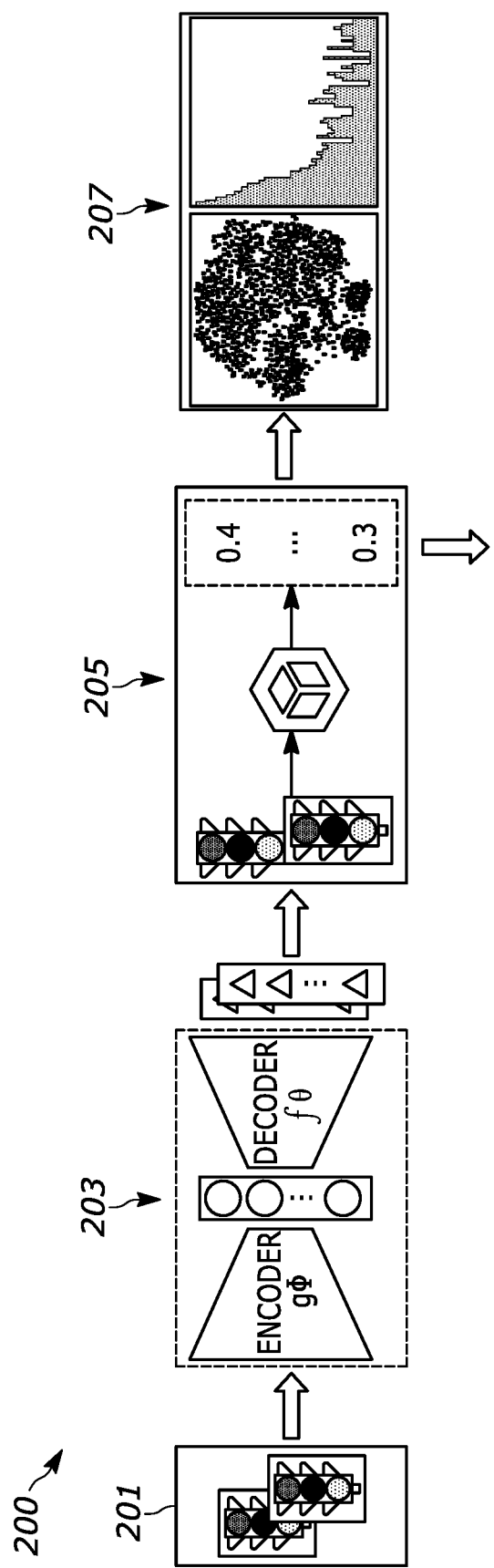
FIG. 2 discloses an embodiment of a semantic adversarial training system 200.

FIG. 2 discloses an embodiment of a semantic adversarial training system 200. In one example, a traffic light detection problem may be utilized. At a high level, the system may first learn a semantic adversarial generator with a disentangled representation learning based approach, such as a Variational Auto-Encoder (VAE), and then generate adversarial examples with semantics to test a target model. The adversarial examples and test results may be summarized and reported. A data source input may include object images 201 (e.g., driving scenes with traffic lights) and includes components such as semantic adversarial learning component 203, semantic adversarial generation and testing 205, and semantic adversarial reporting 207. As such, the semantic adversarial training system 200 may be utilized in an autonomous driving scenario.

The semantic adversarial learning component 203 may learn a semantic adversarial generator with a disentangled representation learning approach, such as VAE, beta-VAE, etc. (as shown below in FIG. 3.). The component may first train a generator with disentangled representation and then learn a distribution of adversarial mean shift for each training data in the latent spaces of the pretrained generator. By injecting the mean shift into the generator, the system can generate adversarial examples. Those adversarial examples can then be utilized for later training. Thus, the objects that are typically identified may be simulated by adding the adversarial noise to see how the system can predict identification. The adversarial noise may be changes in various attributes of the image, object, or video, such as contrast, background color, brightness, etc.

Figure 4:
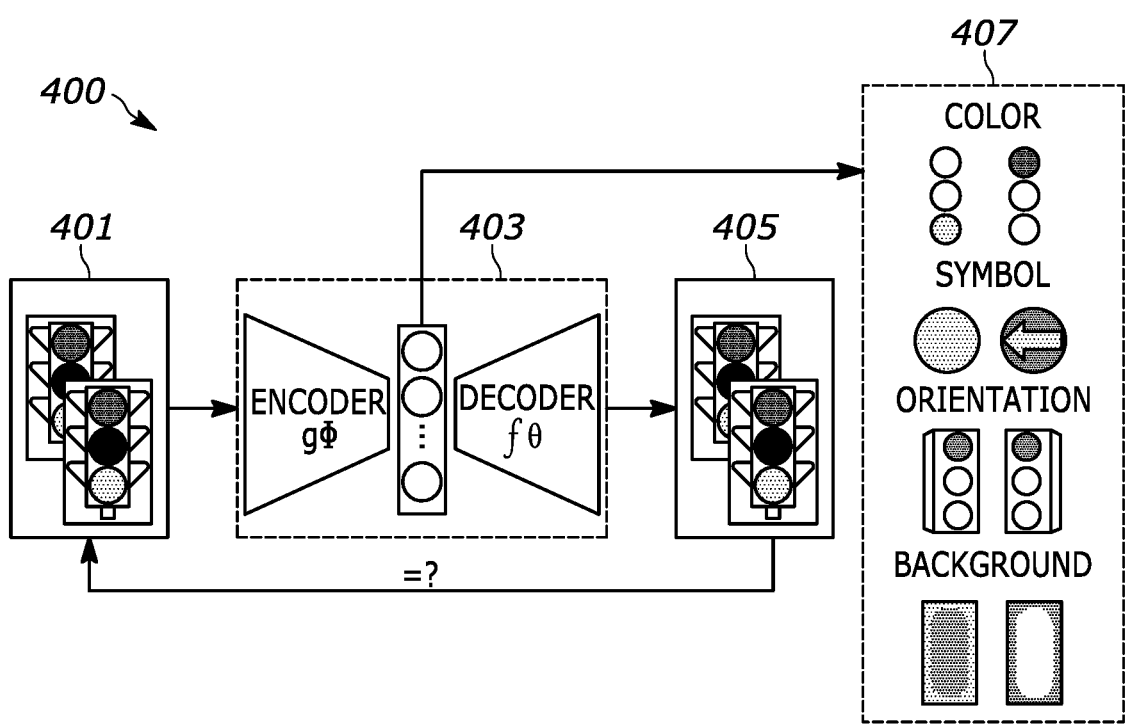
FIG. 4 discloses a system with a pre-training process of a generator with disentangled representation.

The system may pretrain a generator with disentangled representation. The system may attempt to learn an image generator with interpretable latent presentation. The system can then interpret what semantic changes such examples have. A disentangled representation model, e.g., VAE, may be adopted in one embodiment. As shown in FIG. 4 below, the VAE model can learn a disentangled latent space and then generate new images from the latent space. A desirable characteristic of these latent dimensions is that they may have semantics. For example, one dimension may capture the color changes of traffic lights, and another may represent various rotation of the objects, or other characteristics.

The adversarial generator learning component may learn a distribution of mean shift in the latent space of the pretrained generator and the mean shift can generate images that fail a target model. Thus, the system may purposely attempt to cause failure in the system to better train the system. The system may thus utilize a black-box method with limited queries towards the target model. Instead of typical systems may be searching small noises in the image space, the system may attempt to learn a mean shift in the latent space.

Figure 3:
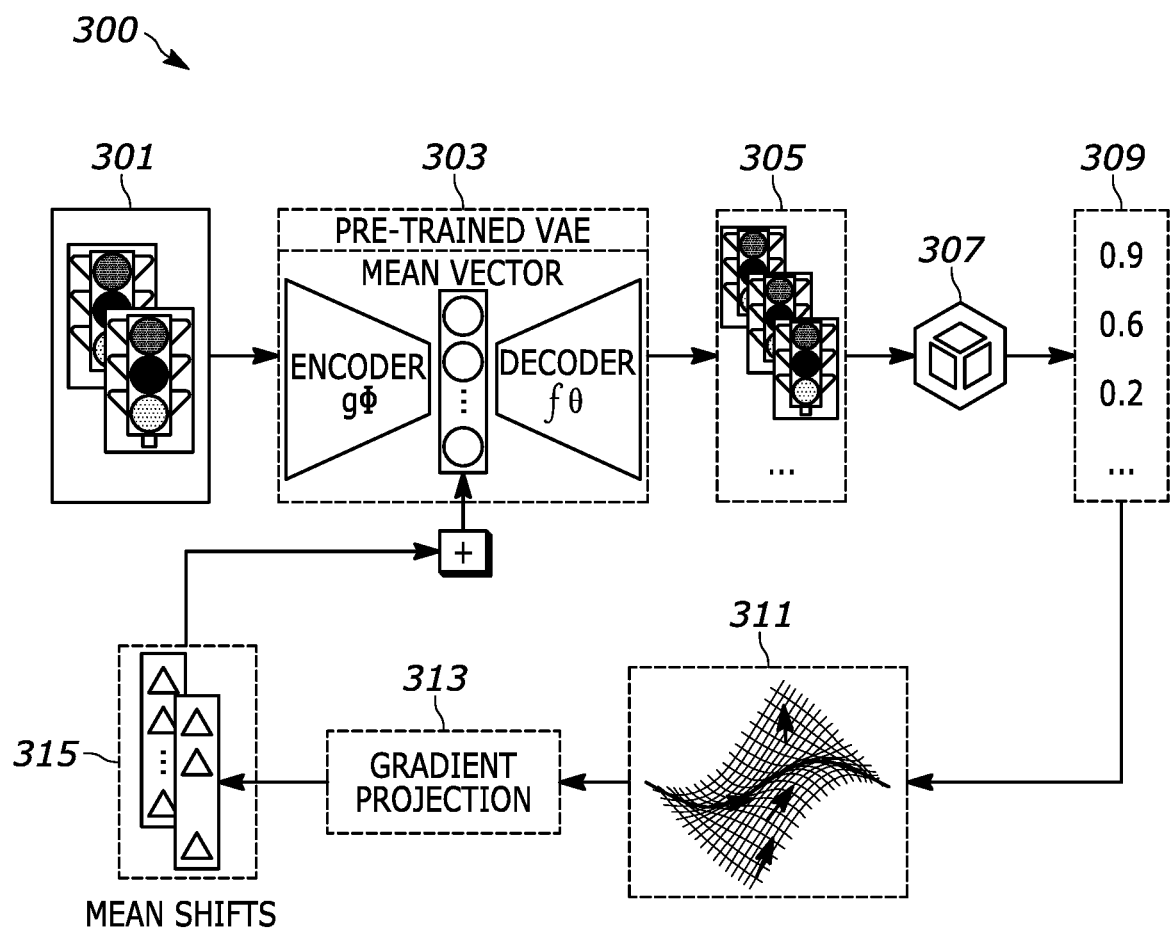
FIG. 3 discloses a semantic adversarial learning system 300 with limited black-box queries.

FIG. 3 discloses a semantic adversarial learning system 300 with limited black-box queries. For a specific input image 301, the goal may be to learn a mean shift vector for this image to generate an adversarial image to fail the model. Thus, when the failure occurs, the system may learn weakness of the current detection method. As shown in FIG. 3, for a specific input image 301, the goal may be to learn a mean shift vector for this image to generate an adversarial image to fail the model. The process may be to first encode the image into a mean vector with VAE, and then starts with a random shift vector with small means. Then, the system can perturb a set of data samples around the current mean shift vectors, and use them to generate new test images. Next, feeding these test images to a target model, the system can obtain the test scores. These test scores 309 may be used to estimate the gradients 311 that are used to update the mean of the shift vector as a classic SGD (Stochastic gradient descent) approach. This process stops as an adversarial example is found or a limited query budget is met.

The input 301 may be fed into the disentangled representation adversarial generator 303. The input 301 may be images or videos, as well as other The generator 303 may then output generated objects 305. The generator 303 may change various attributes of the input 301 The generated objects 305 may be fed into the black-box detector 307. Test results 309 may be output which are later used for gradient estimation 311. The changes of test scores 309 along with the variations of attributes in 303 are used to estimate the gradients utilized to update the mean shift vectors. The gradient estimation can be approximated by the ratio between the test score variance in 309 and the variance of attributes in 303. The gradient projection 313 may be fed into mean shifts 315, which are in turn fed into the generator 303.

The system may generate an adversarial example for an input image with a pre-trained VAE generator and an adversarial mean shift. The system may add the mean shift vector to the encoded mean latent vector of the input image, and then pass the addition results thorough the decoder to generate an adversarial example. The system can semantically summarize and quantify a target model's robustness with the learned semantic adversarial examples. The system may be utilized to cluster all mean shift vectors 315 of adversarial and visually summarize the adversarial patterns. The clustering results bears semantic implications because the mean vectors include semantics with the disentangled representation learning.

The mean shift 315 may be utilized to identify weakness in detected issues with certain adversarial noises. For example, the system may be able to identify issues that the system is having with changes in brightness to the input image when the adversarial noise adjusts the brightness. The system can then feed such results into the system, as shown between the output of the mean shift 315 being fed into the generator 303. Thus, the system can focus on those specific adversarial noises to improve on.

As shown in FIG. 4, a system 400 may include a pre-training process of a generator with disentangled representation. The disentangled representation may utilize a VAE, for example. The input 401 (e.g., traffic light image) may be fed into the VAE 403. The input 401 may include any type of data input, such as an image or video. The VAE 403 may include an encoder at a first pass. There may also be multiple passes, including a second pass, a third pass all the way up to an Nth pass. Latent variables may be sequentially updated to learn the residual between the input data and the reconstruction from the previous updated latent variables during each forward pass. The network may output the reconstruction, as disentangled semantic vectors, x'. The VAE may include an encoder network that may be $g\theta$ and a decoder that is defined as $f\theta$.

The decoder of the VAE 403 may output of each internal step ($\hat{x}_1, \ldots, \hat{x}_{10}$) and their corresponding residuals ($\Delta_1, \ldots, \Delta_{10}$) may be output. The result may show that the decoder's output and residuals may work together to capture and output the learned disentangled factor at each step. For example, factors in each step may be X-position, Y position, Size, Rotation+shape, and Shape, Color, Symbol, Orientation, Background, etc. In one example, the X-position of the reconstructed image are generated during the first step. In step two, both X-position and Y-position may be generated. This process may continue and at each step the decoder 307 output and the residual transform the image according to the learned latent encoding.

The "residual learning" mechanism may consist of d forward passes with the same (or similar) encoder $g\theta$ and decoder $f\theta$. Latent variables may be sequentially sampled from the encoding of the residual between the input data and the accumulated reconstruction. In each step, the added latent variable may follow the distribution learned from the current residual, while previous latent variables may follow the same distribution learned from their corresponding residuals.

The VAE 403 may output a disentangled representation 405. The disentangled representation 405 may have a disentangled semantic vector 407 that has altered the original input 401. For example, the disentangled semantic vector 407 may alter an attribute (e.g., latent variable) of the image so that the object represented by the image appears altered. The disentangled semantic vector 407 may include changes to color. For example, rather than showing a green light in one area, the VAE may alter the image to output a red traffic light. The disentangled semantic vector 407 may include changes to a symbol utilized to represent the object. For example, rather than showing a circle that is filled in for the light, the VAE may alter the image to output symbol as the light, such as an arrow. In another example, the disentangled semantic vector 407 may include a change in orientation of the traffic light. In yet another example, the disentangled semantic vector 407 may include a change in the background color.

Figure 5A:
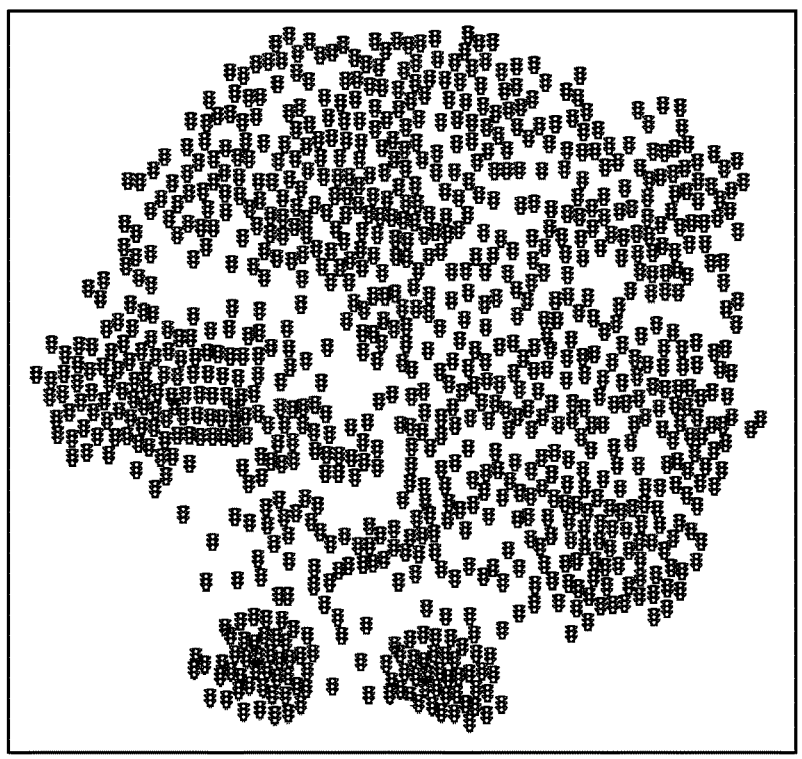
FIG. 5A is a clustered view of original images.
Figure 5B:
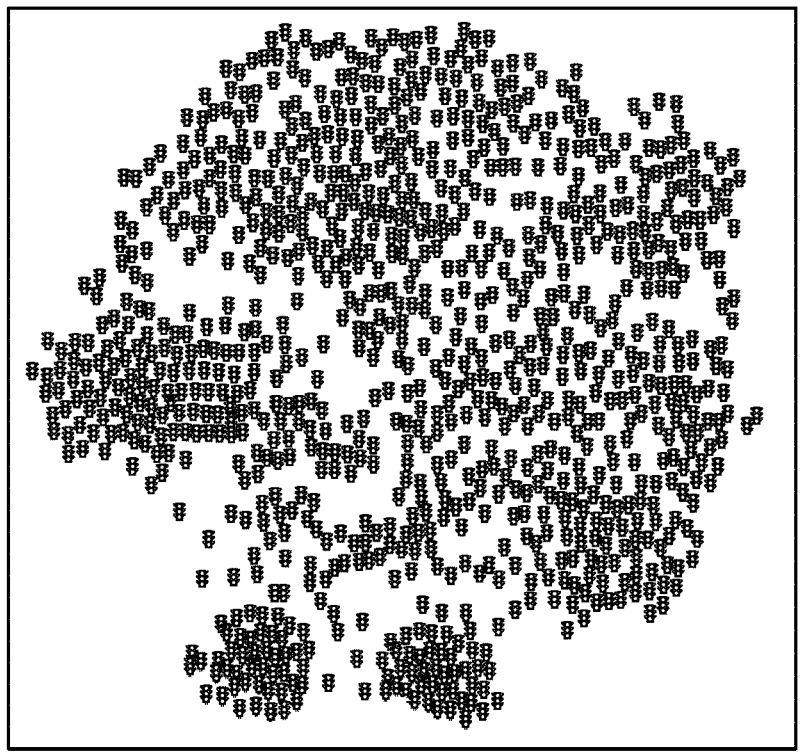
FIG. 5B is a clustered view of the original images with the learned adversarial examples.
Figure 5C:
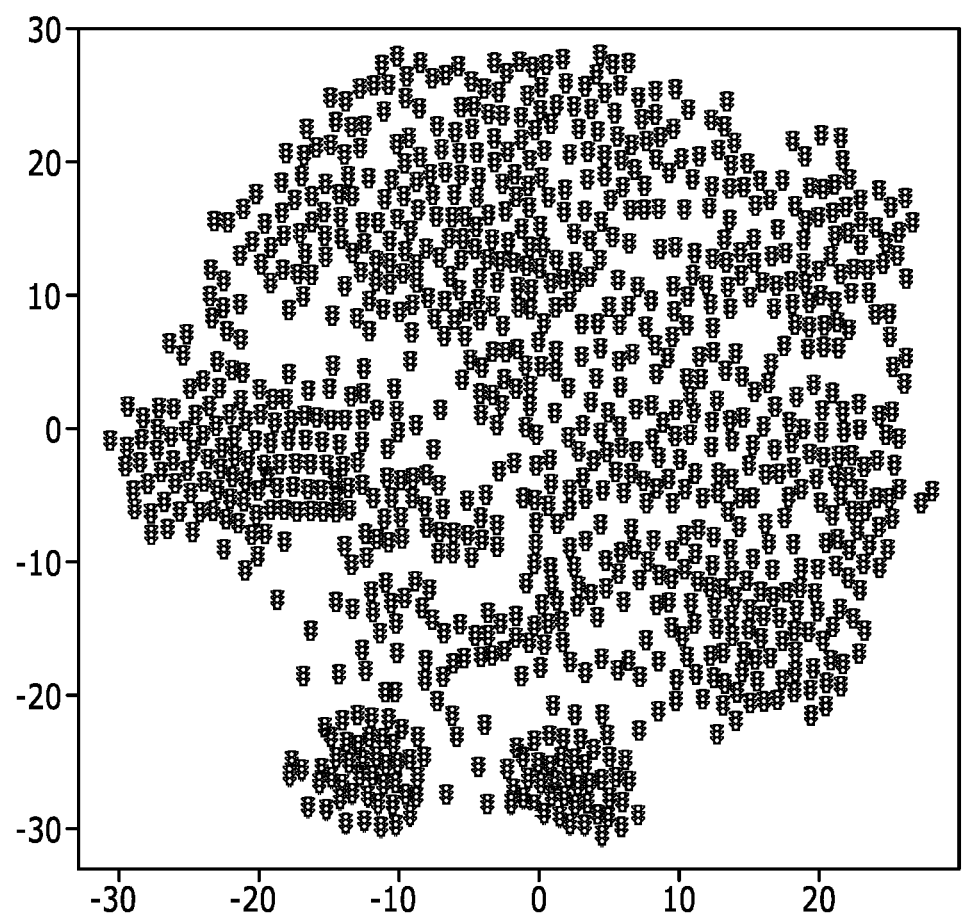
FIG. 5C is a clustered view of a pixel value difference between the learned adversarial and original inputs.

FIG. 5A is a clustered view of original images. FIG. 5B is a clustered view of the original images with the learned adversarial examples. The adversarial examples may thus have different attributes associated with the images. Such attributes may include the color, symbol, orientation, background, etc. FIG. 5C is a clustered view of a pixel value difference between the learned adversarial and original inputs. Pixels at the bottom portion of the cluster and lower right of the figure may indicate the amount of change and have larger difference values.

FIG. 5A shows the clustering results by t-sne with two components, and then visualize the images in the 2D plane. The left one shows the original images and the right one show corresponding adversarial generation. The images of FIG. 5A may be the original images that can be easily detected and classified. The system may add the adversarial examples on top of the original images. For FIG. 5B, the system may visualize the adversarial examples on top of it. FIG. 5C visualizes the pixel value difference between the adversarial and original images.

The Figures can show the change in patterns for adversarial images (the brightness indicates the amount of change: brighter pixels have larger difference values): the cluster on the left side may indicate removal of many green pixels of the lights from the original images; the cluster on the right top reduces yellow pixels; and the bottom two clusters may indicate removal of the outlines of traffic lights.

The system may be able to quantify the robustness by utilizing a model of robustness as the ratio of the score drop (e.g., as the test results) of an adversarial example over the amount of changes the adversarial requires, as shown below:

$$M\_rbt = |Zm\_org - Zm\_gen| / |S\_org - S\_adv|$$

|S_org−S_adv| is the score difference and |Zm_org−Zm_gen| is the mean vector L1 distance. The measurement may indicate how much manipulating effort is needed to reduce model performance. The system may also measure the robustness for each cluster and thus can understand how robust the model is as it is attacked by different patterns. The attack patterns can be understood and explained by the changes in the semantic latent space, namely, Zm_org−Zm_gen. For example, latent dims with large changes can be interpreted as reducing specific color or changing the object outlines.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system, comprising:
   a camera configured to obtain image information from objects; and
   a processor in communication with the camera and programmed to:
   receive an input data including the image information;
   encode the input data via an encoder;
   obtain a latent variable defining an attribute of the input data, generate a sequential reconstruction of the input data utilizing at least the latent variable and an adversarial noise, obtain a residual between the input data and the sequential reconstruction utilizing a comparison of at least the input data and the reconstruction to learn a mean shift in latent space; and
   output the mean shift indicating a test result of the input data compared to the adversarial noise based on the comparison.

2. The system of claim 1, wherein the output of the mean shift is sent to a generator and in response to the mean shift, the generator is configured to generate additional adversarial noises.

3. The system of claim 1, wherein the system is further configured to output a mean shift vector associated with a gradient estimation of the comparison.

4. The system of claim 1, wherein the adversarial noise includes an input image.

5. The system of claim 1, wherein the encoder is a neural network encoder.

6. The system of claim 1, wherein the adversarial noise alters brightness, color, or contrast of the input data.

7. The system of claim 1, wherein the input data includes video information obtained from the camera.

8. An apparatus, comprising:
   a processor programmed to:
   receive an input data including at least an image of an object;
   encode the input data via an encoder;
   obtain a latent variable defining an attribute of the input data, generate a sequential reconstruction of the input data utilizing at least the latent variable and an adversarial noise, obtain a residual between the input data and the sequential reconstruction utilizing a comparison of at least the input data and the reconstruction to learn a mean shift in latent space; and
   output the mean shift indicating a test result of the input compared to the adversarial noise based on the comparison.

9. The apparatus of claim 8, wherein the test result includes a numerical value.

10. The apparatus of claim 8, wherein the output of the mean shift is sent to generate additional adversarial noise.

11. The apparatus of claim 8, wherein the processor is further programmed to in a first sequence, compare the residual of a first and second latent variable, and in a second sequence, compare the residual between the first and second latent variable.

12. The apparatus of claim 8, wherein the encoder is a neural network encoder.

13. The apparatus of claim 8, wherein the adversarial noise includes an input image that includes alterations to the input data including at least the image of the object.

14. A computer-program product storing instructions in a non-transitory computer-readable storage media which, when executed by a computer, cause the computer to:
   receive an input data;
   encode the input data via an encoder;
   obtain a latent variable defining an attribute of the input data, generate a sequential reconstruction of the input data utilizing at least the latent variable and an adversarial noise, obtain a residual between the input data and the sequential reconstruction utilizing a comparison of at least the input data and the reconstruction of a mean shift in latent space; and
   output a mean shift indicating a test result of the input data compared to the adversarial noise based on the comparison.

15. The computer-program product of claim 14, wherein the input includes an image received from a camera in communication with the computer.

16. The computer-program product of claim 14, wherein the encoder includes a neural network.

17. The computer-program product of claim 14, wherein the input data includes a data set of a plurality of images.

18. The computer-program product of claim 14, wherein the computer-program product further includes instructions to update only one latent variable during each additional sequence.

19. The computer-program product of claim 14, wherein the adversarial noise includes a second input image that includes alterations to the input data including at least the image of an object.

20. The computer-program product of claim 14, wherein the adversarial noise alters brightness, color, or contrast of the input data.

* * * * *